Figure 1:
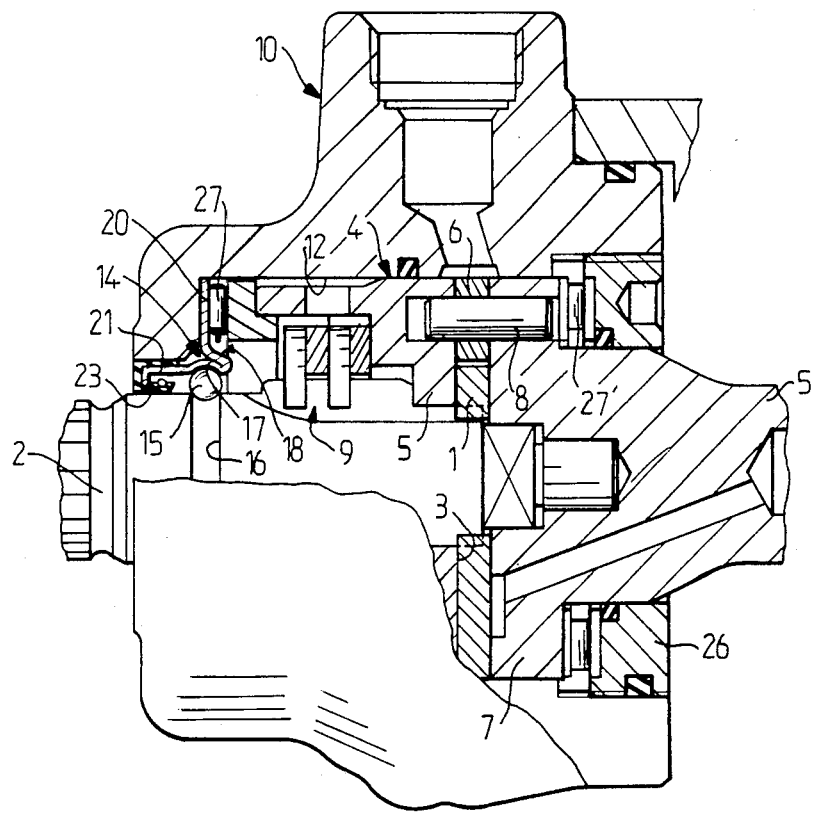

United States Patent [19]
Anguera

[11] Patent Number: 4,749,287
[45] Date of Patent: Jun. 7, 1988

[54] ROTATING AND SEALED BEARING ASSEMBLY OF A FIRST MEMBER ROTATING IN A SECOND MEMBER

[75] Inventor: Narciso M. Anguera, Barcelona, Spain

[73] Assignee: Bendix Espana, S.A., Barcelona, Spain

[21] Appl. No.: 80,720

[22] Filed: Jul. 31, 1987

[30] Foreign Application Priority Data

Aug. 27, 1986 [ES] Spain ................................. 8601383

[51] Int. Cl.4 ............................................ F16C 33/58
[52] U.S. Cl. ................................ 384/484; 384/513; 384/515
[58] Field of Search ............... 384/484, 515, 513, 512, 384/452, 516

[56] References Cited

U.S. PATENT DOCUMENTS

| Re. 14,792 | 1/1920 | Buck | 384/515 |
| 1,720,255 | 7/1929 | Adams | 384/515 |
| 2,768,725 | 10/1956 | Foulds et al. | 384/515 |
| 3,770,991 | 11/1973 | Ladin | 384/484 |

Primary Examiner—Lenard A. Footland
Attorney, Agent, or Firm—Larry J. Palguta; Ken C. Decker

[57] ABSTRACT

The rotating and sealed bearing assembly (14) of a first member (2) rotating in a second member (10) comprises a structure of a bearing outer track constituted by a backing plate in sheet steel (18) shaped in order to present an intermediate zone of rounded profile (17) forming the bearing outer track extending, on one side, folded back (19), by a first zone with radial end (20) and, on the other side, by a second zone with axial end (21) with the lip seal (23) interacting with the first member (2) and, to advantage, a static seal (25) interacting in engagement contact with the housing (10).

9 Claims, 1 Drawing Sheet

ROTATING AND SEALED BEARING ASSEMBLY OF A FIRST MEMBER ROTATING IN A SECOND MEMBER

The present invention relates to a rotating and sealed bearing assembly of a first member rotating in a second member, more particularly, but not exclusively, of a rotating member of a distribution valve for a servomechanism, notably for vehicle power-assisted steering, rotating in a housing of a hydraulic distributor, the assembly being of the type comprising: a bearing outer track structure mounted in a stepped orifice of the second member traversed by the first member and having a lip seal, the bearing inner track structure being formed on the first member.

An assembly of this type is described in the document GB-A-No. 2,122,152. In this document, the lip seal (interacting with a second member rotating separately from the first rotating member forming the bearing inner track) is mounted in the bearing outer track structure which is made in the form of a solid tubular part which must be machined with precision.

The object of the present invention is to provide an assembly of the above-mentioned type, of rugged and light design and with low manufacturing and assembling costs, suitable for very considerable mass production.

To do this, according to a feature of the invention, the bearing outer track structure is made of a sheet steel backing plate shaped in order to present an intermediate zone of rounded profile forming the bearing track proper, extending, on one side, folded back, by a first end zone extending radially, and on the other side by a second end zone extending axially and bearing the lip seal.

Another object of the present invention is to provide an assembly of the type considered enabling static sealing of the assembly to be ensured axially, on both sides, besides dynamic sealing by the lip seal, without excessive manufacturing costs.

To do this, according to another feature of the invention, the second end zone bears in addition a static seal interacting in engagement contact with a first part adjacent to the bore, the static seal and the lip seal being moulded with advantage on the second end zone.

Figure 2:
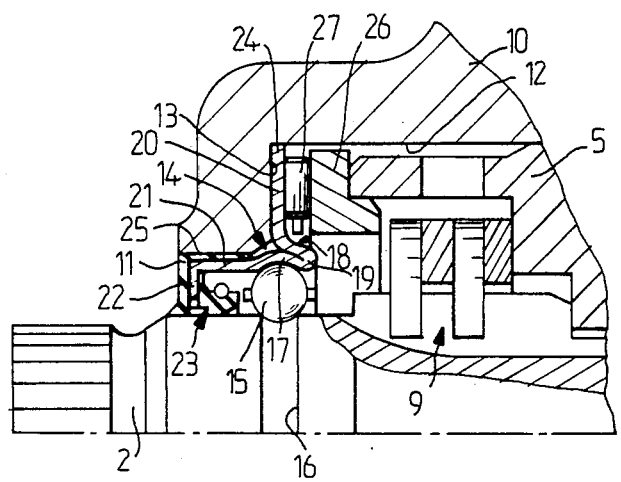

Other features and advantages of the present invention will become evident from the following description of an embodiment, given by way of illustration but in no way limiting, made with reference to the accompanying drawings, in which:

FIG. 1 is a partial view in longitudinal section of a rotating hydraulic distributor for power-assisted steering having a rotating and sealed bearing assembly according to the invention; and FIG. 2 is a detail view on a larger scale of the assembly in FIG. 1.

A hydraulic distributor for power-assisted steering of vehicles of the type described in the document EP-A-No. 0,181,797, in the name of the applicant, is shown diagrammatically in FIG. 1, comprising essentially a star-shaped valve rotor 1 coupled in rotation to an input shaft 2 and mounted to rotate in a disc-shaped chamber 3 of a valve stator, shown generally by the reference 4, coupled in rotation to a coaxial output shaft 5. In the embodiment shown, the stator 4 is constituted by an axial assembly of a first member of stator 5, shims 6 of a thickness corresponding to the axial extension of the disc-shaped chamber 3, and a second member of stator 7 made with advantage in one piece with the output shaft 5, these various components being coupled in rotation by axial pins such as 8.

The output shaft 5/valve stator 4 assembly is coupled to the input shaft 2 by a zero travel flexible coupling having a set of C springs at 9 as described in the document EP-A-No. 0,077,710 in the name of the applicant. The hydraulic distributor is mounted in a housing 10 formed with a stepped through orifice inside constituted by an input bore part 11, of small diameter, through which the input shaft 2 extends, and an inner bore part 12, of large diameter, connected to the input bore part 11 by a radial shoulder 13, the valve stator 4 being mounted to rotate in the input bore part 12.

As may be seen better in FIG. 2, according to the invention, a rotating and sealed bearing assembly 14 is provided between the housing 10 and the input shaft 2. The ball bearings 15 are located between a bearing inner track 16 formed in the output shaft 2, and a bearing outer track constituted by an intermediate zone of rounded profile 17 in a steel sheet backing plate 18, the intermediate zone 17 being extended, on one side by a hairpin fold 19 following the exact shape of half the profile of the intermediate zone 17 and being extended in its turn by a first end zone extending radially 20. On the other side, the intermediate zone 17 is extended by a second end zone 21 extending axially and terminated by an end section 22 extending radially towards the inside on which a structure of lip seal 23 is molded. As may be seen in FIG. 2, the assembly 14 is fitted in the housing 10 with the second end zone 21 extending into the input bore part 11 and with the first end zone 20 flat up against the shoulder 13, the radial extension of this first end zone 20 being determined so that its periphery 24 comes to bear radially, in the assembled position, against the wall of the inner bore part 12. The backing plate 18 is shaped in such a way that, in the assembled position, the first end zone 20 extends substantially radially along the center line of ball bearing 15 so that the radial reaction forces of the bearing are taken up in this plane by the periphery 24 of the zone 20 resting against the inside wall of the bore part 12.

In the preferred embodiment shown, the second end zone 21 extends some distance axially, radially towards the inside, from the wall of the input bore part 11, a static tubular seal 25, with advantage moulded in a single piece with the lip seal 23, being inserted compressed between the second end zone 21 and the wall of the input bore part 11 so as to insulate, dynamically as well as statically, the inner bore part 12 from the outside of the housing 10.

The first end zone 20 extending radially may be locked in position against the shoulder 13 by any adequate means. Preferably, however, in the embodiment shown, where the assembly of stator 4 is held in assembled position in the housing 10 by an assembling ring 26 coaxial to the output shaft 5, with interposition of axial needle roller thrust bearings 27, 27', the first end zone 20 extending radially is used to form a bearing track for the axial thrust bearing 27 which thus ensures, via the axial restraint exerted by the assembling ring 26, through the assembly of stator 4 and an annular bearing track 26 linked to the member 5 adjacent to the stator 4, the locating and maintaining in position of the assembly 14 in the housing 10.

The backing plate 18 of the assembly 14 is made from an annular blank in malleable steel which is first of all shaped by deep stamping to produce the end 22 and the zone extending axially 21 which is thus connected directly, at right angles, to the zone extending radially 20, after which the fold 19, then the intermediate zone with rounded profile 17 are made by knurling.

Although the present invention has been described relative to a particular embodiment, it is not in fact limited thereby but is, on the contrary, amenable to modifications and variations which will be apparent to the person skilled in the art, particularly concerning the detail forms and the respective dimensions of the end zones 20 and 21.

I claim:

1. Rotating and sealed bearing assembly of a first member rotating in a second member, comprising a bearing outer track structure mounted in a stepped orifice of the second member traversed by the first member and bearing a lip seal, a bearing inner track being formed on the first member, characterized in that the bearing outer track structure is made of a steel sheet backing plate shaped in order to present an intermediate zone of rounded profile forming a bearing outer track, extending, on one side folded back, by a first end zone extending radially, and on the other side, by a second end zone extending axially and bearing the lip seal.

2. Assembly according to claim 1, characterized in that the stepped orifice of the second member comprises a first bore part, of small diameter, connected to a second bore part, of large diameter, by a radial shoulder, the first end zone extending the length of the radial shoulder, the second end zone extending axially in the first bore part.

3. Assembly according to claim 2, characterized in that the second end zone bears a static seal interacting in engagement contact with the first bore part.

4. Assembly according to claim 3, characterized in that the lip seal is molded on an end turned back radially of the second end zone.

5. Assembly according to claim 4, characterized in that the lip seal comprises an elongated peripheral part forming the static seal.

6. Assembly according to claim 5, characterized in that the first end zone extends radially along the center line of associated ball bearings.

7. Assembly according to claim 6, characterized in that the first end zone butts radially against the second bore part of the housing by its periphery.

8. Assembly according to claim 7, characterized in that means are provided, in the housing, to lock the first end zone in position up against the radial shoulder of the housing.

9. Assembly according to claim 8, characterized in that the means of locking are constituted by an axial thrust bearing interacting with a third member fitted to rotate in the housing and actioned in rotation by the first member.

* * * * *